(12) United States Patent
Schmitt (10) Patent No.: US 11,527,791 B2
(45) Date of Patent: Dec. 13, 2022

(54) BATTERY MODULE

(71) Applicant: Robert Bosch GmbH, Stuttgart (DE)

(72) Inventor: Markus Schmitt, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 165 days.

(21) Appl. No.: 16/592,175

(22) Filed: Oct. 3, 2019

(65) Prior Publication Data

US 2020/0112072 A1 Apr. 9, 2020

(30) Foreign Application Priority Data

Oct. 4, 2018 (DE) .......................... 102018217022.3

(51) Int. Cl.
| | | |
|---|---|---|
| *H01M 10/6554* | (2014.01) | |
| *H01M 10/6556* | (2014.01) | |
| *H01M 10/625* | (2014.01) | |
| *H01M 50/20* | (2021.01) | |
| *H01M 10/6551* | (2014.01) | |

(52) U.S. Cl.
CPC ..... *H01M 10/6554* (2015.04); *H01M 10/625* (2015.04); *H01M 10/6551* (2015.04); *H01M 10/6556* (2015.04); *H01M 50/20* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 8,714,394 B2 * | 5/2014 | Wulf ...................... | B65D 43/02 |
| | | | 220/784 |
| 2013/0014923 A1 | 1/2013 | Girmscheid et al. | |
| 2014/0234687 A1* | 8/2014 | Fuhr ................... | H01M 10/625 |
| | | | 429/120 |
| 2014/0322582 A1* | 10/2014 | Ruter .................... | H01M 50/20 |
| | | | 429/120 |
| 2016/0093932 A1* | 3/2016 | Obasih ................ | H01M 10/647 |
| | | | 429/120 |
| 2018/0062226 A1* | 3/2018 | Raiser ............... | H01M 10/6554 |
| 2018/0212292 A1* | 7/2018 | Maguire ........... | H01M 10/6554 |

FOREIGN PATENT DOCUMENTS

| | | |
|---|---|---|
| DE | 102008059955 | 6/2010 |
| DE | 202012102349 | 7/2012 |
| DE | 102017201710 A1 | 8/2018 |
| EP | 2693522 A1 | 2/2014 |

* cited by examiner

*Primary Examiner* — Ula C Ruddock
*Assistant Examiner* — Mary Grace Byram
(74) *Attorney, Agent, or Firm* — Michael Best & Friedrich LLP (57) ABSTRACT

A battery module comprising a plurality of battery cells (2), in particular lithium-ion battery cells (20), which are received in a receptacle space (11) of the battery module (1), wherein the battery module (1) has a temperature-regulating plate (5) configured for regulating the temperature of the plurality of battery cells (2), said temperature-regulating plate furthermore forming a receptacle element (6) that receives a housing element (10) of the battery module (1) in such a way that the receptacle space (11) is closed off vis-à-vis the surroundings (12) of the battery module (1), wherein the housing element (10) is connected to the temperature-regulating plate (5) in a positively locking and/or force-locking manner by means of a securing element (8) formed by the temperature-regulating plate (5).

14 Claims, 6 Drawing Sheets

BATTERY MODULE

BACKGROUND OF THE INVENTION

The invention is based on a battery module.

It is known from the prior art that battery modules can consist of a plurality of individual battery cells which can be electrically conductively interconnected with one another in series and/or in parallel.

Hybrid-driven electric vehicles (HEVs) and also electrically driven vehicles (EVs) require high-energy and high-capacity battery systems in order that the electric drive machines thereof can achieve driving performance levels to be achieved.

In this case, high-energy and high-capacity lithium-ion or lithium-polymer battery cells are usually used as electrical energy stores, with approximately 100 battery cells being interconnected to form a battery module.

Such high-performance battery cells here each have a capacity of approximately 90 ampere-hours (Ah).

Particularly in electrically operating vehicles or else in hybrid electric vehicles and in stationary applications, use is made of battery systems usually with a plurality of such battery modules.

Battery cells can be embodied here for example as prismatic or cylindrical battery cells, with so-called pouch cells also increasingly being used in the field of electromobility.

Particularly during charging and discharging, lithium-ion or lithium-polymer battery cells heat up on account of chemical conversion processes.

The higher the performance of such a battery module here, the greater the resulting heating, too, and so efficient and active temperature-regulating systems that can both heat and cool the battery cells are often required.

It is known here from the prior art that battery modules can have a cooling plate through which temperature-regulating fluid can flow and which is configured to regulate the temperature of the battery cells of a battery module, that is to say to cool or else to heat them.

By way of example, the documents DE 20 2012 102 349 U1 and DE 10 2008 059 955 A1 disclose such cooling plates known from the prior art, which are embodied in particular from a first plate element and a second plate element cohesively connected to the first plate element.

SUMMARY OF THE INVENTION

A battery module according to the invention affords the advantage that a plurality of battery cells can be received in a receptacle space of the battery module in a reliable and simple manner.

Furthermore, a battery module according to the invention affords the advantage, in particular, that it is possible to form a reliable separation between a temperature-regulating fluid and a receptacle space that receives the plurality of battery cells of the battery module.

To that end, the invention provides a battery module comprising a plurality of battery cells.

In this case, the battery cells are embodied in particular as lithium-ion battery cells.

Furthermore, the battery cells are received in a receptacle space of the battery module. In this case, the battery module furthermore has a temperature-regulating plate configured for regulating the temperature of the plurality of battery cells.

Furthermore, the temperature-regulating plate forms a receptacle element.

In this case, the receptacle element of the temperature-regulating plate receives a housing element of the battery module in such a way that the receptacle space is closed off vis-à-vis the surroundings of the battery module.

In this case, the housing element is connected to the temperature-regulating plate in a positively locking and/or force-locking manner by means of a securing element formed by the temperature-regulating plate.

A positively locking connection between the securing element of the temperature-regulating plate and the housing element should be understood here to mean that the housing element latches, engages or snaps into the receptacle element of the temperature-regulating plate by means of the securing element, for example.

A force-locking connection between the securing element of the temperature-regulating plate and the housing element should be understood here to mean that the securing element and the housing element are secured to one another or held together by means of a friction force formed between them.

It is advantageous if the receptacle element of the temperature-regulating plate is embodied as a groove.

It is thereby possible to provide a simple embodiment of the receptacle element, which embodiment enables the housing element of the battery module to be received by the receptacle element of the temperature-regulating plate in a reliable manner.

A groove should be understood here to mean for example a depression which is introduced into the temperature-regulating plate and which preferably circumferentially surrounds the temperature-regulating plate.

It is expedient if a sealing element is furthermore arranged between the temperature-regulating plate and the housing element of the battery module.

In particular, it is possible in this case for the sealing element to be embodied in this case as a separate insert part, for example, or for the sealing element to be embodied for example as an adhesive, as a sealant or as a sealing element attached to the housing element.

This affords the advantage that the receptacle space of the battery module can be sealed vis-à-vis the surroundings in particular solely by the sealing element arranged between the temperature-regulating plate and the housing element of the battery module.

Furthermore, this affords the particular advantage that there is no need to form additional sealing between a flow space that receives a temperature-regulating fluid and the receptacle space of the battery module, with the result that the safety of the battery module can be increased in a reliable and simple manner.

Advantageously, the securing element formed by the temperature-regulating plate is embodied as an elastically and/or plastically deformable spring element.

A plastic deformation differs from an elastic deformation to the effect that, in the case of a plastic deformation, the deformation formed is not reversed, but rather remains formed with the attendant formation of material changes, whereas in the case of an elastic deformation the original state is reestablished after the deformation force has been removed.

The embodiment of the securing element as an elastically and/or plastically deformable spring element has the advantage, in particular, that additional, separate securing elements such as screws, rivets or clips are not required.

In this case, the securing element can be embodied for example in such a way that, under a plastic deformation, the securing element is movable from a first position into a second position in such a way that, when arranged in the second position, the securing element connects the housing element to the temperature-regulating plate in a positively locking and/or force-locking manner.

In this case, the securing element can for example also be embodied in such a way that, under an elastic deformation, the securing element is movable from a first position into a second position in such a way that, when arranged in the second position, the securing element connects the housing element to the temperature-regulating plate in a positively locking and/or force-locking manner, wherein the securing element is held in the second position for example by a positively locking and/or force-locking connection to the housing element.

In accordance with one expedient aspect of the invention, the temperature-regulating plate forms a flow space through which temperature-regulating fluid can flow.

This has the advantage that a reliable regulation of the temperature of the plurality of battery cells can be formed.

In particular, this affords the particular technical advantage that the temperature-regulating plate can be embodied in such a way that there is no need to form additional sealing between the receptacle space of the battery module and the temperature-regulating plate.

It goes without saying that it is also possible, however, that the temperature-regulating plate can comprise a phase change material, for example, such that the invention presented here is not restricted to the preferred embodiment of a flow space through which temperature-regulating fluid can flow.

Expediently, the temperature-regulating plate comprises a first plate element and a second plate element, which are cohesively connected to one another to form the flow space.

In this case, it is possible, for example, for the first plate element and/or the second plate element to form supporting structures which serve for forming the flow space, and in particular the flow fields thereof, and contribute to maintaining a required internal pressure in order to ensure a stable embodiment of the flow space.

It is preferred in this case for the first plate element and the second plate element to be connected to one another cohesively, such as is embodied for example in a soldered or welded manner.

Such an embodiment of the temperature-regulating plate affords in particular the advantage, which is preferred in the context of this invention, that the flow space can be arranged in such a way that there is no need to form additional sealing between the flow space and the receptacle space that receives the plurality of battery cells of the battery module, since the temperature-regulating plate can be embodied in such a way that the flow space is separated from the receptacle space solely by the arrangement of the first plate element with respect to the second plate element.

It is preferred if the temperature-regulating plate has a first connection configured for temperature-regulating fluid to flow into the flow space and a second connection configured for temperature-regulating fluid to flow out of the flow space.

In this case, the first connection and the second connection are sealed with respect to the housing.

By means of the first connection and the second connection this is possible to connect the flow space to further structures, such as, for example, the temperature-regulating circuit of a vehicle that receives the battery module according to the invention.

This has the advantage that the first connection and the second connection can be sealed with respect to the housing element in such a way that there is no need to form additional sealing with respect to the receptacle space.

In accordance with one expedient aspect of the invention, the plurality of battery cells is arranged directly at the temperature-regulating plate. It is thereby possible to form a reliable directly formed heat transfer between the plurality of battery cells and the temperature-regulating plate.

Consequently, the plurality of battery cells can be temperature-regulated in a reliable manner, such as in particular reliably cooled, such that the battery cells can be operated in a preferred temperature range.

Furthermore, it can alternatively also be expedient if the plurality of battery cells is connected to the temperature-regulating plate cohesively, such as in an adhesively bonded manner, for example.

It is thereby possible to form a reliably formed securing between the battery cells and the temperature-regulating plate.

In particular, the cohesive connection formed in an adhesively bonded manner can additionally comprise additives for improving the thermal conductivity.

It is expedient if the temperature-regulating plate forms a base of the battery module.

A base should be understood here to mean, given a customary arrangement of the battery module, in particular an underside of the battery module. It is thus possible that the cooling plate can be embodied as a carrying component of the battery module. The embodiment of the temperature-regulating plate as a preferably closed base of the battery module makes it possible to save an additional component, such as a separate base element, for example, since the base element can be formed by the cooling plate.

A battery module according to the invention as just described can be used for example in electrically driven motor vehicles or else in stationary energy storage systems, and so the use of the battery module according to the invention in these systems is also intended to be the subject matter of the present invention.

BRIEF DESCRIPTION OF THE DRAWINGS

Exemplary embodiments of the invention are illustrated in the drawings and explained in greater detail in the following description.

In the figures.

DETAILED DESCRIPTION

Figure 1:
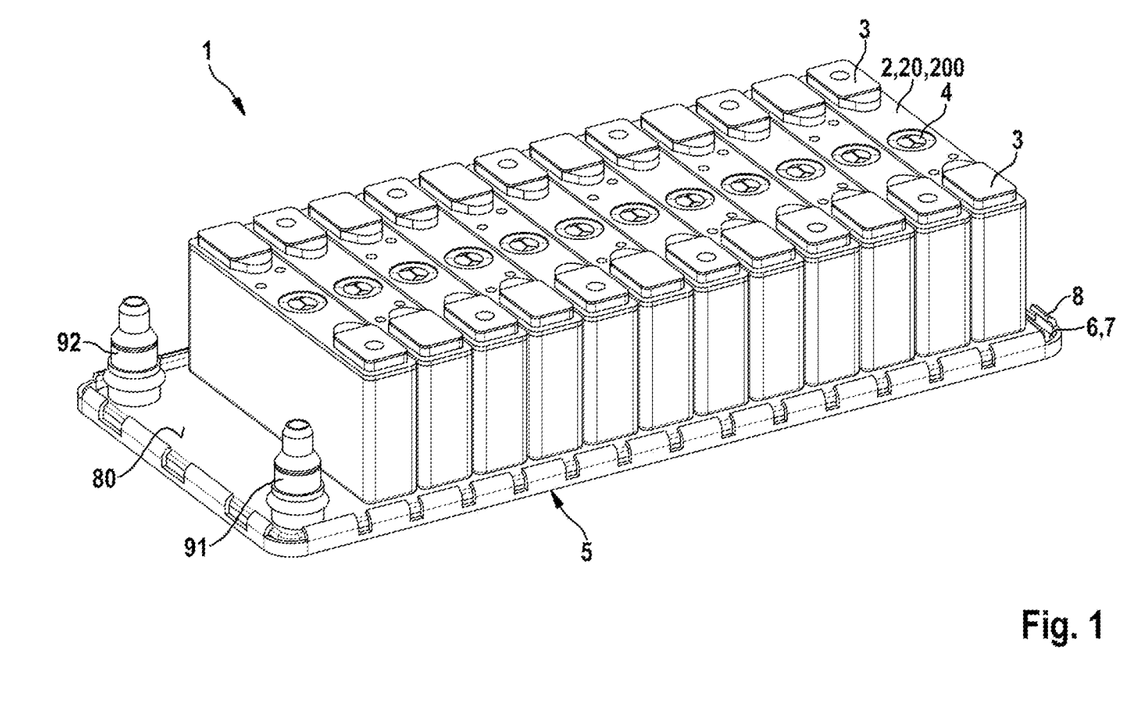
FIG. 1 shows an excerpt from a battery module according to the invention without a housing element.

FIG. 1 shows a battery module 1, wherein a housing element of the battery module 1 is not discernible.

The battery module 1 has a plurality of battery cells 2.

The battery cells 2 are each embodied here in particular as lithium-ion battery cells 20.

By way of example, in accordance with the exemplary embodiment in FIG. 1, the battery cells 2 are embodied as prismatic battery cells 200.

Furthermore, the battery cells 2, 20, 200 each have voltage taps 3, by means of which the plurality of battery cells 2 can be electrically interconnected in series and/or in parallel by means of cell connectors, not shown in FIG. 1.

Furthermore, the battery cells 2, 20, 200 additionally also have gas venting openings 4, which serve to allow gas to escape from the interior of the battery cells 2 particularly in safety-critical situations.

Furthermore, FIG. 1 also shows that the battery module 1 has a temperature-regulating plate 5. In this case, the temperature-regulating plate 5 is configured to regulate the temperature of the plurality of battery cells 2.

Furthermore, the temperature-regulating plate 5 forms a receptacle element 6 configured to receive a housing element of the battery module 1, said housing element not being discernible in FIG. 1.

In accordance with the exemplary embodiments of the invention as shown in the figures, the receptacle element 6 of the temperature-regulating plate 5 is embodied here as a groove 7.

In particular, FIG. 1 shows here that the receptacle element 6 of the temperature-regulating plate 5 that is embodied as a groove 7 can be arranged circumferentially on a top side 80 of the temperature-regulating plate 5 facing the battery cells 2.

It should already be noted at this juncture that the temperature-regulating plate 5 forms securing elements 8 configured to connect a housing element, not discernible in FIG. 1, to the temperature-regulating plate 5 in a positively locking and/or force-locking manner.

Furthermore, the temperature-regulating plate 5 forms a first connection 91 and a second connection 92. In this case, the first connection 91 is configured to the effect that temperature-regulating fluid can flow into a flow space of the temperature-regulating plate 5.

In this case, the second connection 92 is configured to the effect that temperature-regulating fluid can flow out of the flow space of the temperature-regulating plate 5.

FIG. 1 also reveals that the plurality of battery cells 2 are arranged directly at the temperature-regulating plate 5.

Furthermore, it is also conceivable for the battery cells 2 to be connected to the temperature-regulating plate 5 cohesively, such as preferably in an adhesively bonded manner, for example. As a result, it is possible to form a reliable heat transfer between the temperature-regulating plate 5 and the battery cells 2.

Figure 2:
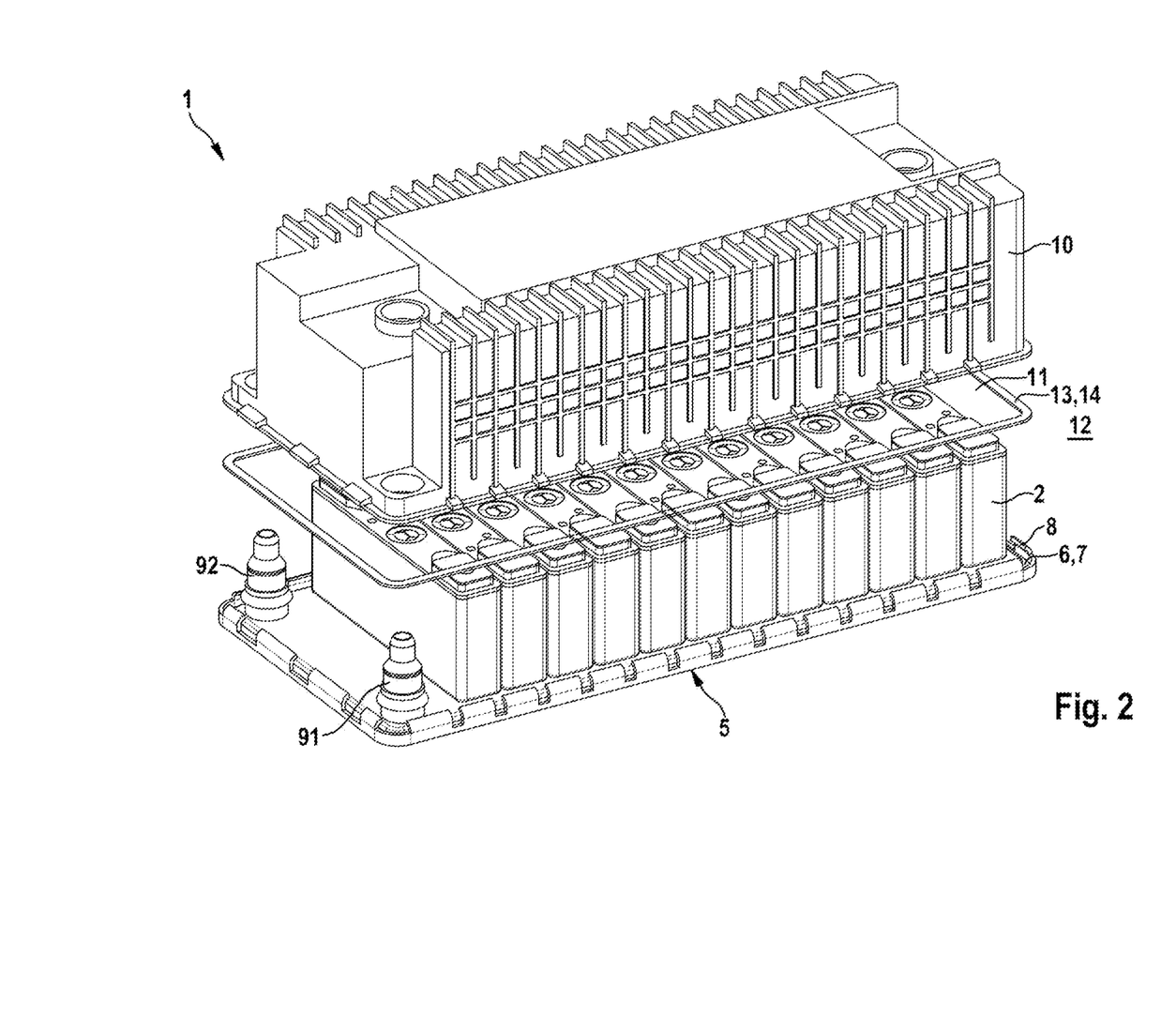
FIG. 2 shows a battery module according to the invention in a perspective exploded illustration.

FIG. 2 shows a battery module 1 according to the invention in an exploded illustration.

In contrast to FIG. 1, FIG. 2 furthermore also shows a housing element 10 of the battery module 1.

In this case, the housing element 10 can be received by the receptacle element 6 of the temperature-regulating plate 5 in such a way that a receptacle space 11 is formed, which receives the plurality of battery cells 2.

After the housing element 10 has been received by the receptacle element 6 of the temperature-regulating plate 5, the receptacle space 11 is closed off vis-à-vis the surroundings 12 of the battery module 1.

In this case, the housing element 10 can be connected to the temperature-regulating plate 5 in a positively locking and/or force-locking manner by means of the securing elements 8 formed by the temperature-regulating plate 5, although this will also be described with reference to the further figures.

Furthermore, it is already evident from FIG. 2 that a sealing element 13 can furthermore be arranged between the temperature-regulating plate 5 and the housing element 10 of the battery module 1.

In accordance with the exemplary embodiment in FIG. 2, the sealing element 13 is embodied here as an insert part 14.

Figure 3:
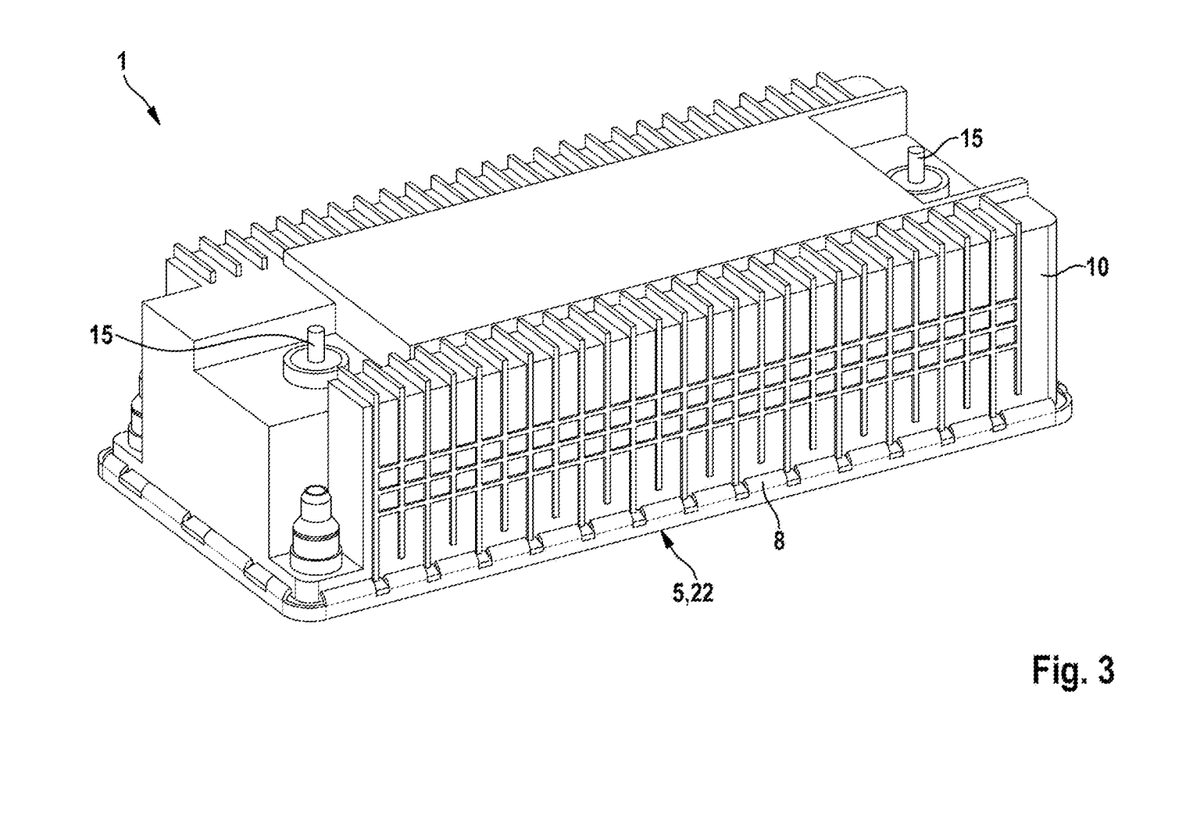
FIG. 3 shows a battery module according to the invention in a perspective view.

FIG. 3 shows one embodiment of the battery module 1 in an assembled state; in particular, the exemplary embodiment in FIG. 3 corresponds to the battery module 1 shown in an exploded illustration in FIG. 2.

At this juncture, in association with FIG. 3, it should also be pointed out that the securing elements 8 formed by the temperature-regulating plate 5 connect the housing element 10 to the temperature-regulating plate 5 in a positively locking and/or force-locking manner.

Furthermore, FIG. 3 reveals that the battery module 1 has electrical connections 15 led out from the housing element 10, said electrical connections serving for tapping of the voltage of the battery module 1.

It is evident in particular from the illustration in FIG. 3 that the temperature-regulating plate 5 forms a base 22 of the battery module 1.

In this case, a base 22 should be understood to mean that part of the battery module 1 which, given a customary arrangement of the battery module 1, is arranged at an underside of the battery module 1 and by which the battery module 1 stands on a support, for example.

Figure 4:
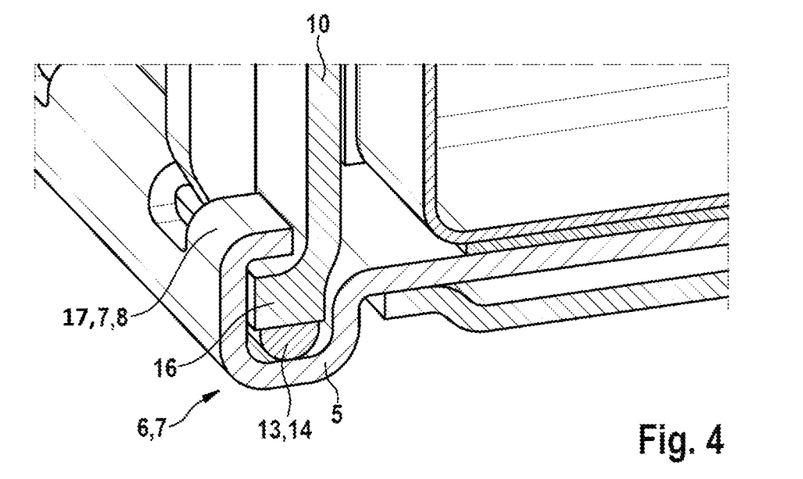
FIG. 4 shows, in a sectional view, a connection between the housing element and the securing element from a battery module according to the invention.

FIG. 4 shows, in a sectional view, a connection of the housing element 10 to the temperature-regulating plate 5.

In this case, it is evident that the receptacle element 6 of the temperature-regulating plate 5 is embodied as a groove 7.

Furthermore, the housing element 10 forms a projection 16 configured to engage into the groove 7 of the temperature-regulating plate 5.

After the projection 16 of the housing element 10 has engaged into the groove 7 of the temperature-regulating plate 5, the housing element 10 is secured in the receptacle element 6 of the temperature-regulating plate 5 that is embodied as a groove 7.

To that end, the temperature-regulating plate 5 forms securing elements 8, which are embodied as elastically and/or plastically deformable spring elements 17 in accordance with the exemplary embodiment in FIG. 4.

In this case, it is possible, for example, for engagement of the projection 16 of the housing element 10 into the groove 7 of the temperature-regulating plate 5 to result in the spring element 17 being elastically deformed and securing the housing element 10 in the groove after the engagement. Such a connection can for example also be understood as a clip connection.

Furthermore, it is also possible for the spring element 17 to be plastically deformed from a first position into a second position after the engagement of the projection 16 of the housing element 10 into the groove 7 of the temperature-regulating plate 5, such that when the spring element 17 is arranged in a second position, the housing element 10 is secured in the groove 7. In particular, FIG. 4 shows here an arrangement of the spring element 17 plastically deformed in the second position.

At this juncture, it should also be noted in this respect that FIG. 4 also shows the sealing element 13 embodied as an insert part 14, said sealing element being arranged between the temperature-regulating plate 5 and the housing element 10 of the battery module 1.

Figure 5:
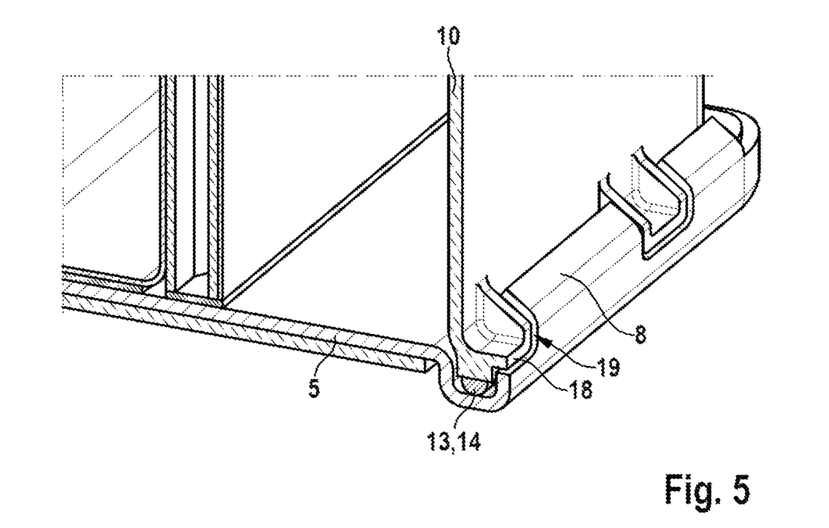
FIG. 5 shows, in a sectional view, a further connection between the housing element and the securing element of a battery module according to the invention.

FIG. 5 shows, in a further sectional view, the connection of the housing element 10 to the temperature-regulating plate 5.

In particular, it should also be noted in this respect that the housing element 10 can also comprise supporting elements 18, which can provide for increasing the stability of the connection between the housing element 10 and the temperature-regulating plate 5.

In this case, it is furthermore evident from FIG. 5 that securing elements 8 are not arranged circumferentially at the temperature-regulating plate 5, but rather can have interruptions 19, wherein the spacer elements 18 are arranged in the region of the interruptions 19.

Figure 6:
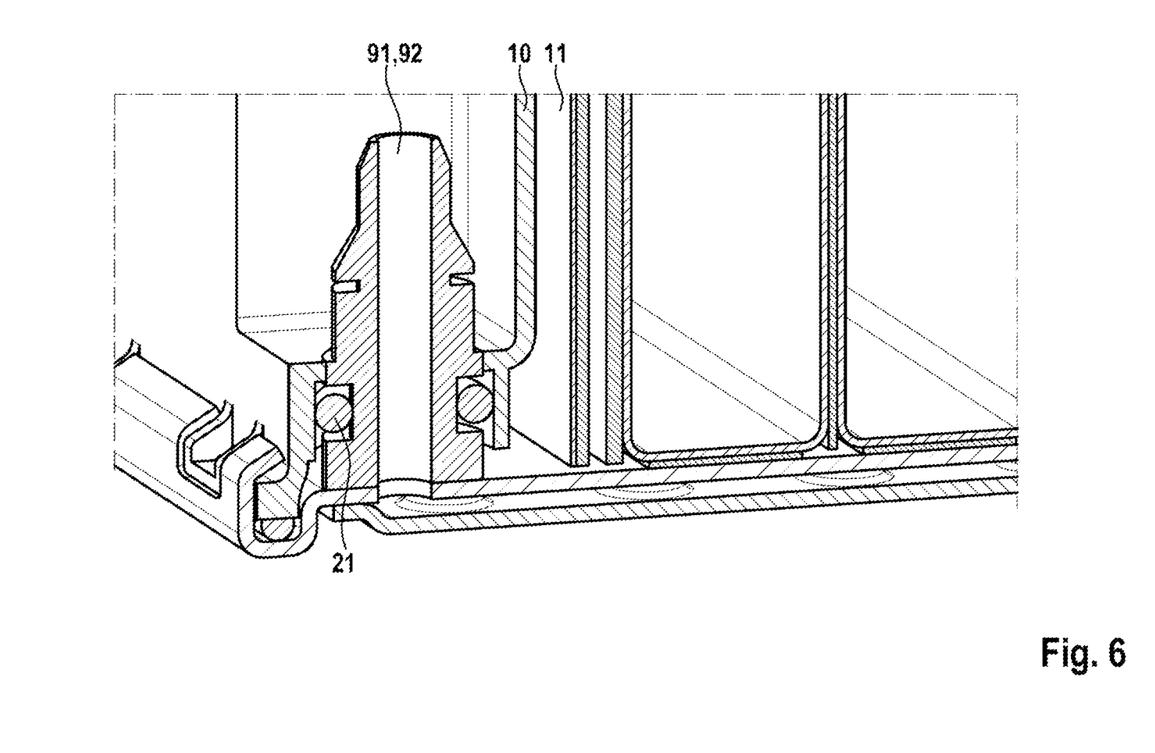
FIG. 6 shows a sectional view through the first connection or the second connection of the temperature-regulating plate of a battery module according to the invention.

FIG. 6 shows, in a sectional view, in particular the first connection 91 or the second connection 92.

As already noted, the first connection 91 is configured for temperature-regulating fluid to flow into the flow space of the temperature-regulating plate 5 and the second connection 92 is configured for temperature-regulating fluid to flow out of the flow space.

In this case, FIG. 6 reveals that the first connection 91 and respectively the second connection 92 are sealed with respect to the housing element 10 by means of a sealing element 21.

In this case, the connection 91 and respectively the second connection 92 need only be sealed with respect to the housing element 10, with the interior of the battery module 1 and respectively the receptacle space 11 thus being sealed vis-à-vis the surroundings.

Figure 7:
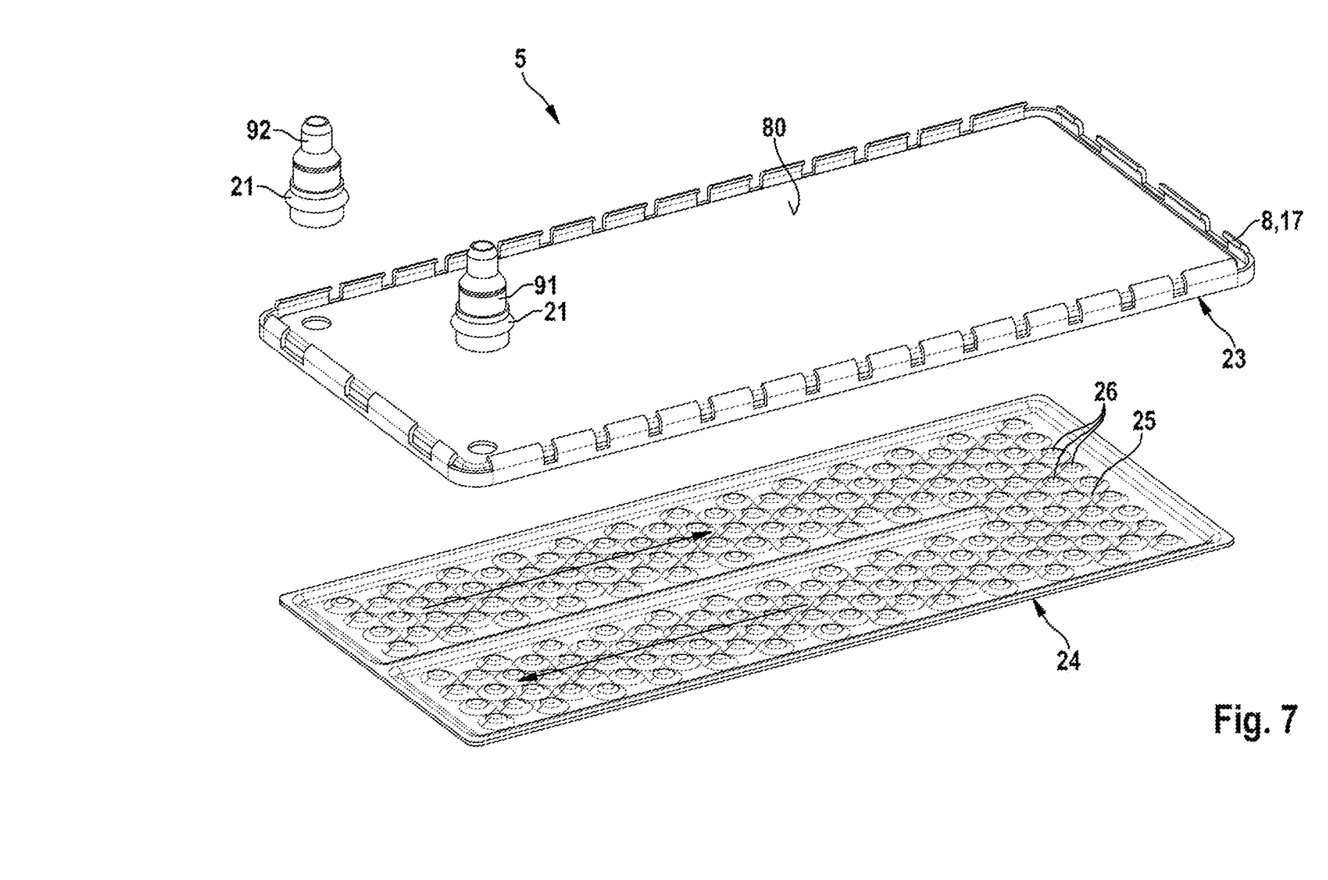
FIG. 7 shows temperature-regulating plate of a battery module according to the invention in a perspective exploded illustration.

FIG. 7 shows one embodiment of a temperature-regulating plate 5 of a battery module 1 according to the invention in an exploded illustration.

In this case, FIG. 7 firstly shows that the temperature-regulating plate 5 comprises a first plate element 23 and a second plate element 24.

In this case, the first plate element 23 and the second plate element 24 can be connected to one another to form a flow space 25.

Preferably, in this case, the first plate element 23 and the second plate element 24 can be cohesively connected to one another.

In this case, temperature-regulating fluid can flow through the flow space 25.

Furthermore, FIG. 7 also shows that, for example, the second plate element 24 forms supporting elements 26 that are used to the effect that the first plate element 23 and the second plate element 24 can be connected to one another to form the flow space 25.

In this case, the first plate element 23 and the second plate element 24 can be connected to one another for example cohesively, such as preferably in a soldered or else welded manner.

Furthermore, the first connection 91 and the second connection 92 are also discernible.

In this case, the first connection 91 and respectively the second connection 92 comprise the sealing element 21.

Furthermore, FIG. 7 also reveals the top side 80, at which is arranged the plurality of battery cells 2, as is evident from FIG. 1.

Furthermore, FIG. 7 also shows the securing elements 8 embodied as spring elements 17 embodied in elastically and/or plastically deformable fashion.

Moreover, the receptacle element 6 arranged circumferentially at the temperature-regulating plate 5 is also discernible, said receptacle element being embodied as a groove 7.

What is claimed is:

1. A battery module comprising a plurality of battery cells (2) received in a receptacle space (11) of the battery module (1), the battery module (1) comprising a temperature-regulating plate (5) configured for regulating the temperature of the plurality of battery cells (2), said temperature-regulating plate furthermore forming a groove (7) that receives a projection (16) of a housing element (10) of the battery module (1) in such a way that the receptacle space (11) is closed off with respect to surroundings (12) of the battery module (1), wherein the projection (16) extends around a circumference of the housing element (10), wherein the housing element (10) is connected to the temperature-regulating plate (5) in a positively locking and/or force-locking manner by a securing element (8) formed by the temperature-regulating plate (5), wherein the groove (7) extends around a periphery of the temperature-regulating plate (5), and wherein the securing element (8) is a plastically deformable spring element (17) that is folded over the projection (16) to retain the projection (16) of the housing element (10) within the groove (7) to thereby retain the temperature-regulating plate (5) against the housing element (10).

2. The battery module according to claim 1, further comprising a sealing element (13) between the temperature-regulating plate (5) and the housing element (10).

3. The battery module according to claim 1, characterized in that the temperature-regulating plate (5) forms a flow space (25) through which temperature-regulating fluid can flow.

4. The battery module according to claim 3, characterized in that the temperature-regulating plate (5) comprises a first plate element (23) and a second plate element (24), which are cohesively connected to one another to form the flow space (25).

5. The battery module according to claim 3, characterized in that the temperature-regulating plate (5) has a first connection (91) configured for temperature-regulating fluid to flow into the flow space (25) and a second connection (92) configured for temperature-regulating fluid to flow out of the flow space (25), wherein the first connection (91) and the second connection (92) are sealed with respect to the housing element (10).

6. The battery module according to claim 1, characterized in that the plurality of battery cells (2) is arranged directly on the temperature-regulating plate (5).

7. The battery module according to claim 1, characterized in that the plurality of battery cells (2) is connected to the temperature-regulating plate (5) cohesively.

8. The battery module according to claim 1, characterized in that the plurality of battery cells (2) is connected to the temperature-regulating plate (5) in an adhesively bonded manner.

9. The battery module according to claim 1, characterized in that the temperature-regulating plate (5) forms a base (22) of the battery module (1).

10. The battery module according to claim 1, wherein the securing element (8) is one of a plurality of securing elements (8) formed by the temperature-regulating plate (5), and
wherein the plurality of securing elements (8) are plastically deformable spring elements (17),
characterized in that the plurality of securing elements (8) engage more than half of an outermost circumference of the housing element (10) to connect the housing element (10) to the temperature-regulating plate (5) in a positively locking and/or force-locking manner.

11. The battery module according to claim 10, wherein the outermost circumference of the housing element (10) is approximately rectangular, and wherein the plurality of securing elements (8) engage each of four sides of the approximately rectangular outermost circumference of the housing element (10).

12. The battery module according to claim 10, wherein the plurality of securing elements (8) are plastically deformed to follow a contour of the housing element (10).

13. A battery module comprising a plurality of battery cells (2) received in a receptacle space (11) of the battery module (1), the battery module (1) comprising a temperature-regulating plate (5) configured for regulating the temperature of the plurality of battery cells (2), said temperature-regulating plate furthermore forming a groove (7) that receives a housing element (10) of the battery module (1) in such a way that the receptacle space (11) is closed off with respect to surroundings (12) of the battery module (1), characterized in that a plurality of securing elements (8) formed by the temperature-regulating plate (5) are folded over a portion of the housing element (10) to engage more than half of an outermost circumference of the housing element (10) to retain the housing element (10) in the groove (7) of the temperature-regulating plate (5) in a positively locking and/or force-locking manner, wherein the plurality of securing elements (8) are plastically deformable spring elements (7) that are plastically deformed to follow a contour of the housing element (10).

14. The battery module according to claim 13, wherein the outermost circumference of the housing element (10) is approximately rectangular, and wherein the plurality of securing elements (8) engage each of four sides of the approximately rectangular outermost circumference of the housing element (10).

\* \* \* \* \*